(12) United States Patent
Liu

(10) Patent No.: US 8,960,042 B2
(45) Date of Patent: Feb. 24, 2015

(54) ROBOT ARM ASSEMBLY

(71) Applicant: Zhen-Xing Liu, Shenzhen (CN)

(72) Inventor: Zhen-Xing Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 155 days.

(21) Appl. No.: 13/651,626

(22) Filed: Oct. 15, 2012

(65) Prior Publication Data
US 2013/0118288 A1 May 16, 2013

(30) Foreign Application Priority Data
Nov. 11, 2011 (CN) .......................... 2011 1 0356640

(51) Int. Cl.
*B25J 17/00* (2006.01)
*B25J 18/00* (2006.01)
*B25J 17/02* (2006.01)
*B25J 9/10* (2006.01)

(52) U.S. Cl.
CPC *B25J 9/102* (2013.01); *B25J 9/104* (2013.01); *B25J 17/0258* (2013.01)
USPC ..................................... 74/490.05; 74/490.03

(58) Field of Classification Search
CPC ............ B25J 18/00; B25J 9/102; B25J 9/104; B25J 9/0024; B25J 9/1025
USPC .............................. 74/490.01, 490.03, 490.05
See application file for complete search history.

(56) References Cited

U.S. PATENT DOCUMENTS

| | | | | |
|---|---|---|---|---|
| 8,516,920 B2 * | 8/2013 | Liu | ............................ | 74/490.06 |
| 8,590,415 B2 * | 11/2013 | Long | .......................... | 74/490.05 |
| 2010/0229670 A1 * | 9/2010 | Nogami et al. | ............ | 74/490.01 |
| 2011/0252921 A1 * | 10/2011 | Nakagiri et al. | ............ | 74/665 R |

FOREIGN PATENT DOCUMENTS

| | | |
|---|---|---|
| CN | 102114630 A | 7/2011 |
| CN | 202029133 U | 11/2011 |
| JP | 4-300190 A | 10/1992 |

* cited by examiner

*Primary Examiner* — Justin Krause
(74) *Attorney, Agent, or Firm* — Novak Druce Connolly Bove + Quigg LLP

(57) ABSTRACT

A robot arm assembly includes a supporting arm, first and second mechanical arms, a first driving member, a second driving member, a first transmission mechanism between the first mechanical arm and the first driving member, and a second transmission mechanism between the second mechanical arm and the second driving member. The first driving member drives the first transmission mechanism to rotate the first mechanical arm. The second driving member drives the second transmission mechanism to rotate the second mechanical arm. The first driving member and the second driving member are both carried in the supporting arm and are arranged side by side.

10 Claims, 3 Drawing Sheets

ROBOT ARM ASSEMBLY

BACKGROUND

1. Technical Field

The present disclosure generally relates to industrial robots, and particularly to a robot arm assembly.

2. Description of Related Art

An industrial robot, such as a six-axis robot, may include a first mechanical arm rotating around one axis and a second mechanical arm rotatably connected to the first mechanical arm and rotating around another axis. An actuator, such as a detector, a welding device, a gripper or a cutting tool, is mounted on a distal end of the second mechanical arm to execute specific tasks. In industrial robots of this kind, each of the first mechanical arm and the second mechanical arm is driven by a motor to rotate around an axis. The two motors may be located at a supporting arm rotatably connected to the first mechanical arm, and are arranged along the length direction of the supporting arm, which increases the length of the supporting arm and the total volume of the six-axis robot. The six-axis robot of related art cannot be installed to operate safely in a small workspace or small working area.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
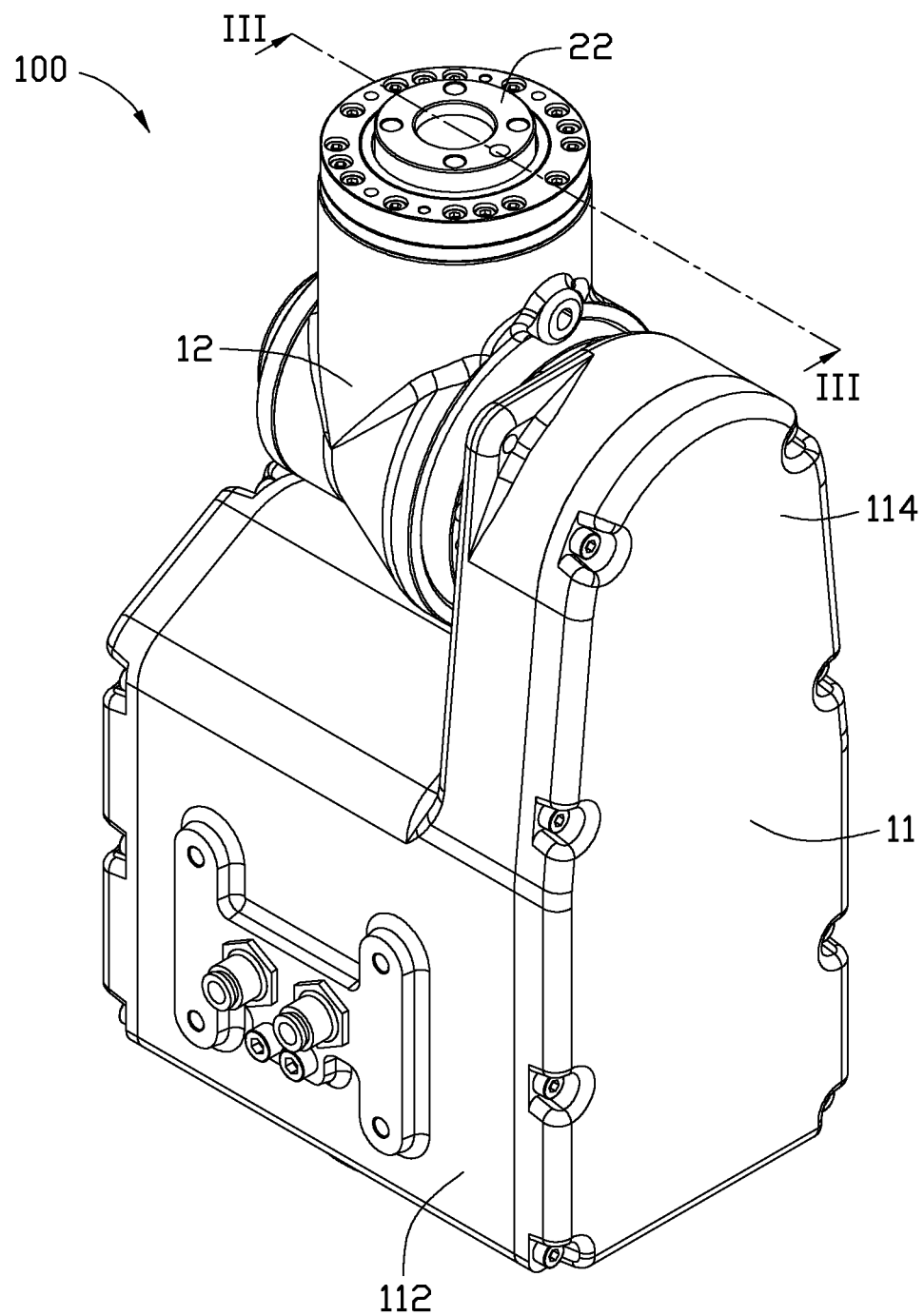
FIG. 1 is an assembled, isometric view of an embodiment of a robot arm assembly.
Figure 2:
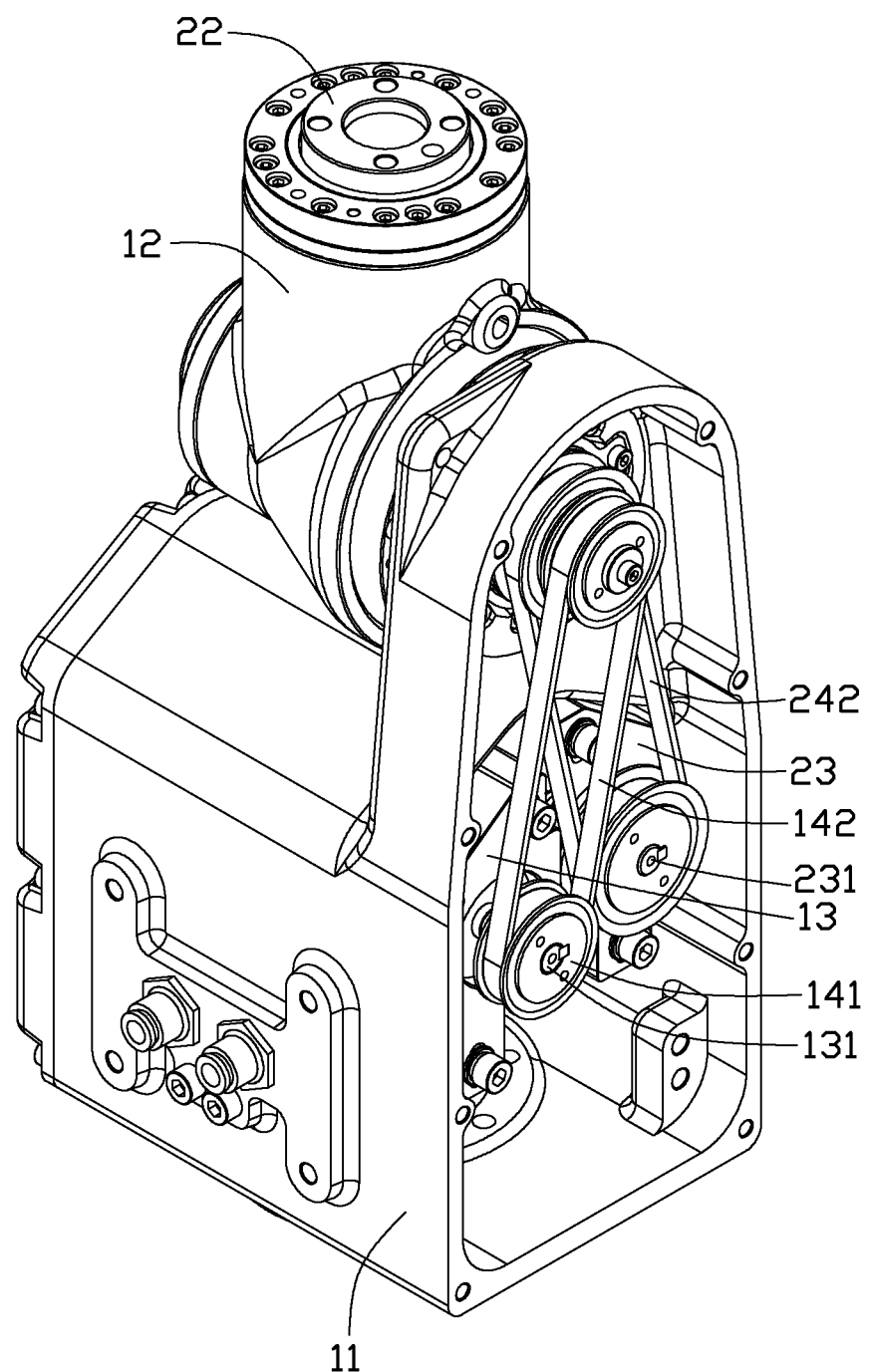
FIG. 2 is an assembled, isometric view of the robot arm assembly with a side wall of the robot arm assembly of FIG. 1 being removed.
Figure 3:
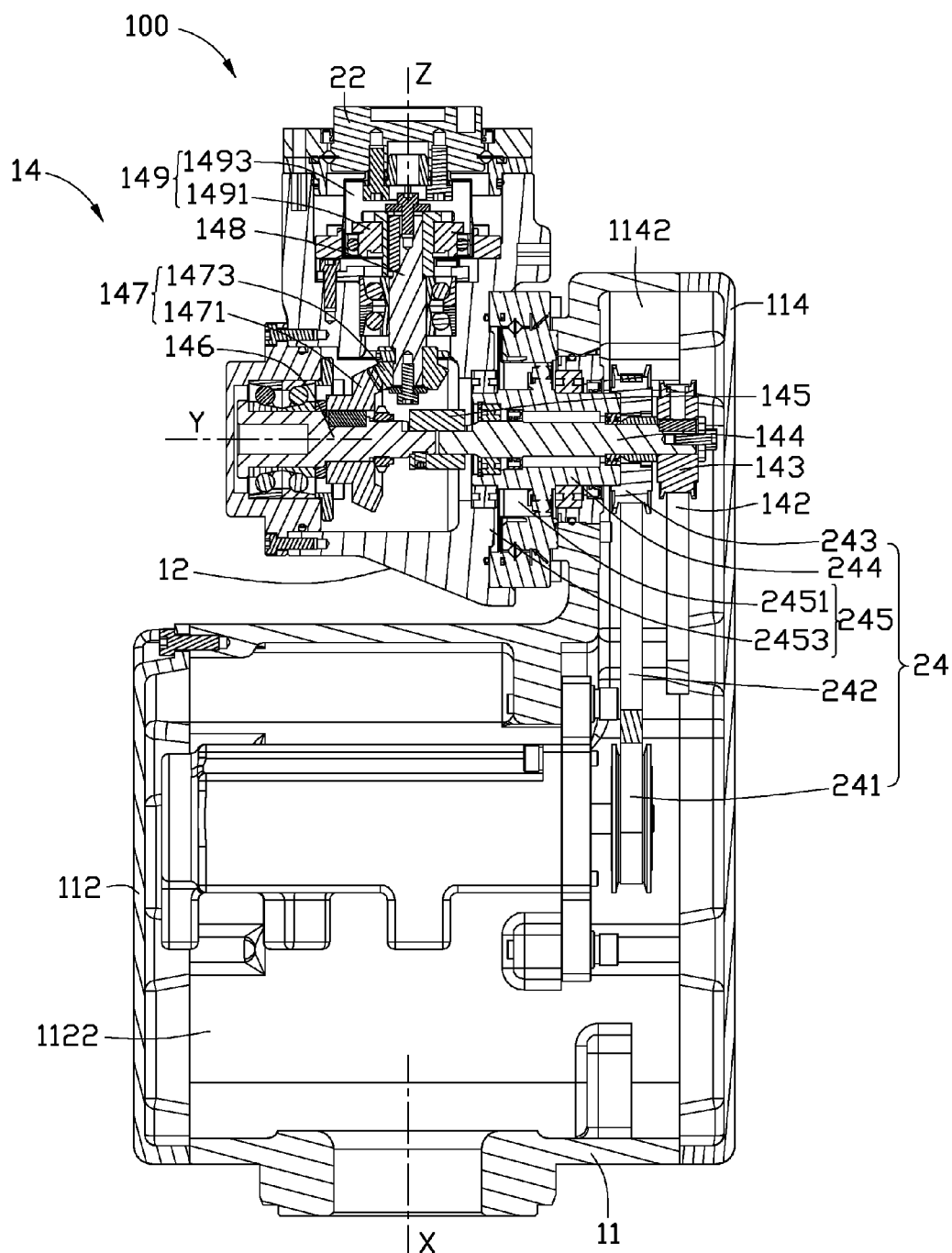
FIG. 3 is a cross-sectional view of the robot arm assembly of FIG. 1, taken along the line III-III.

Referring to FIGS. 1 through 3, an embodiment of a robot arm assembly 100 includes a supporting arm 11, a first mechanical arm 12, a first driving member 13, a first transmission mechanism 14, a second mechanical arm 22, a second driving member 23, and a second transmission mechanism 24. The first mechanical arm 12 is rotatably connected to the support arm 11. The second mechanical arm 22 is rotatably connected to the first mechanical arm 12. The first transmission mechanism 14 is located between the first mechanical arm 12 and the first driving member 13. The second transmission mechanism 24 is located between the second mechanical arm 22 and the second driving member 23. The first driving member 13 drives the first transmission mechanism 14 so as to rotate the first mechanical arm 12. The second driving member 23 drives the second transmission mechanism 24 so as to rotate the second mechanical arm 22.

Referring to FIG. 3, the robot arm assembly 100 is applied to a six-axis robot (not shown). The supporting arm 11 rotates around a first rotation axis X of the six-axis robot, the first mechanical arm 12 rotates around a second rotation axis Y of the six-axis robot, and the second mechanical arm 22 rotates around a third rotation axis Z of the six-axis robot. The first and third rotation axes X and Z are substantially parallel to each other and both rotation axes are substantially perpendicular to the second rotation axis Y. The second mechanical arm 22 is at a distal end of the six-axis robot, and an actuator, such as a detector, a welding device, a gripper or a cutting tool, is mounted at the distal end of the second mechanical arm 22 to execute specific tasks.

The supporting arm 11 is a hollow and substantially L-shaped structure, and includes a base seat 112 and a fastening seat 114 extending from an end of the base seat 112. The supporting arm 11 defines a first receiving space 1122 in the base seat 112 and a second receiving space 1142 in the fastening seat 114 communicating with the first receiving space 1122.

The first driving member 13 and the second driving member 23 are both received in the supporting arm 11, and are arranged side by side onto the supporting arm 11, thereby reducing the length of the supporting arm 11. In the illustrated embodiment, the first driving member 13 and the second driving member 23 are both motors. Each of the first driving member 13 and the second driving member 23 includes a drive shaft 131. In alternative embodiments, any one of the first driving member 13 and the second driving member 23 may be an air-powered rotating cylinder.

The first mechanical arm 12 is rotatably connected to the fastening seat 114 of the supporting arm 11. The second mechanical arm 22 is rotatably connected to a distal end of the first mechanical arm 12 away from the supporting arm 11. The first mechanical arm 12 is substantially a hollow cylinder, and the interior space of the first mechanical arm 12 communicates with the second receiving space 1142 for receiving the first transmission mechanism 14 and the second transmission mechanism 24.

The first transmission mechanism 14 includes a first drive wheel 141, a first transmission belt 142, a first action wheel 143, a transmission shaft 144, a first connecting member 145, a fifth shaft 146, a pair of bevel gears 147, a sixth shaft 148, and a reducer 149. The first drive wheel 141 is sleeved on the drive shaft 131 of the first driving member 13 and rotates with the drive shaft 131. The first transmission belt 142 connects the first drive wheel 141 and the first action wheel 143, and the first action wheel 143 can be rotated by the first drive wheel 141 via the first transmission belt 142. The transmission shaft 144 is received in the first mechanical arm 12 and the fastening seat 114, and the first action wheel 143 is sleeved at the end of the transmission shaft 144, and is rotated with the transmission shaft 144. The transmission shaft 144 is angularly fixed to the fifth shaft 146 via the first connecting member 145.

The pair of bevel gears 147 includes a first bevel gear 1471 and a second bevel gear 1473 meshing with the first bevel gear 1471. The first bevel gear 1471 is non-rotatably mounted on the fifth shaft 146. The sixth shaft 148 is perpendicular to the fifth shaft 146, and the second bevel gear 1473 is non-rotatably mounted on an end of the sixth shaft 148 adjacent to the fifth shaft 146.

The reducer 149 includes a flexspline 1491 and a rigid gear 1493 meshing with the flexspline 1491. The flexspline 1491 rotates along with the sixth shaft 148, and the rigid gear 1493 is firmly fastened to the second mechanical arm 22.

In alternative embodiments, the first drive wheel 141 can be a first gear wheel on the drive shaft 131 of the first driving member 13, the first action wheel 143 can be a second gear wheel meshing with the first gear wheel, and the first gear wheel drives the second gear wheel. Thus, the length of the supporting arm 11 becomes significantly shorter.

In alternative embodiments, the transmission shaft 144, the first connecting member 145, and the fifth shaft 146 can be replaced by a single integral transmission member, the first action wheel 143 being fixed on one end of the integral transmission member, and the first bevel gear 1471 of the pair of bevel gears 147 being non-rotatably mounted on the other end of the integral transmission member.

The second transmission mechanism 24 includes a second drive wheel 241, a second transmission belt 242, a second action wheel 243, a transmission member 244, and a reducer 245. The second drive wheel 241 is fixed on the drive shaft 231 of the second driving member 23. The second transmission belt 242 connects the second drive wheel 241 and the second action wheel 243, and the second action wheel 243 is rotated by the second drive wheel 241 via the second transmission belt 242. A rotating bearing (not labeled) rotatably carries the transmission member 244 on the transmission shaft 144. The reducer 245 includes a flexspline 2451 and a rigid gear 2453 meshing with the flexspline 2451. One end of the transmission member 244 is fixed to the second action wheel 243, and the other end of the transmission member 244 is connected to the flexspline 2451 of the reducer 245. The rigid gear 2453 is connected to and drives the first mechanical arm 12.

In use, a detector, a welding device, a gripper or a cutting tool, is mounted on a distal end of the second mechanical arm 22. The first driving member 13 drives the first drive wheel 141, which in turn driving the first action wheel 143 via the first transmission belt 142. The first action wheel 143 drives all of the transmission shaft 144, the fifth shaft 146, the pair of bevel gears 147, the sixth shaft 148, and the reducer 149; and the reducer 149 rotates the second mechanical arm 22 around the third rotation axis Z. The second mechanical arm 22 drives the welding device, the gripper or the cutting tool to function.

The second driving member 23 rotates the second drive wheel 241, and the second drive wheel 241 in turn drives the second action wheel 243 via the second transmission belt 242. The second action wheel 243 drives the transmission member 244 and the reducer 245, and the reducer 245 rotates the first mechanical arm 12 around the second rotation axis Y.

The first driving member 13 and the second driving member 23 are both received in the supporting arm 11, and are configured side by side on the supporting arm 11. This configuration of the respective driving members substantially reduces the length of the supporting arm 11, and thereby significantly reduces the total volume of the robot arm assembly 100.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm assembly comprising:
   a supporting arm;
   a first mechanical arm rotatably connected to the supporting arm;
   a second mechanical arm rotatably connected to the first mechanical arm;
   a first driving member comprising a drive shaft;
   a second driving member;
   a first transmission mechanism located between the first mechanical arm and the first driving member and comprising:
   a first drive wheel sleeved on the drive shaft,
   a first transmission belt,
   a first action wheel rotated by the first drive wheel via the first transmission belt,
   a transmission member non-rotatably connected to the first action wheel,
   a sixth shaft perpendicular to the transmission member,
   a pair of bevel gears connecting the sixth shaft and the transmission member, and
   a reducer connecting the sixth shaft and the second mechanical arm; and
   a second transmission mechanism located between the second mechanical arm and the second driving member, wherein the first driving member drives the first transmission mechanism so as to rotate the first mechanical arm, the second driving member drives the second transmission mechanism so as to rotate the second mechanical arm, and the first driving member and the second driving member are both received in the supporting arm and are arranged side by side onto the supporting arm.

2. The robot arm assembly of claim 1, wherein the supporting arm comprises a base seat and a fastening seat extending from an end of the base seat, and the first mechanical arm is rotatably connected to the fastening seat.

3. The robot arm assembly of claim 2, wherein the supporting arm defines a first receiving space in the base seat, and the first driving member and the second driving member are received in the first receiving space.

4. The robot arm assembly of claim 3, wherein the supporting arm further defines a second receiving space communicating with the first receiving space, and the first transmission mechanism and the second transmission mechanism are both received in the second receiving space.

5. The robot arm assembly of claim 1, wherein the reducer comprises a flexspline and a rigid gear meshing with the flexspline, the flexspline rotates along with the sixth shaft, and the rigid gear is firmly fastened to the second mechanical arm.

6. The robot arm assembly of claim 1, wherein the transmission member comprises a transmission shaft, a connecting member, and a fifth shaft, the transmission shaft and the fifth shaft are fastened to the opposite ends of the connecting member, the transmission shaft is non-rotatably connected to the first action wheel, and the fifth shaft is connected to the pair of bevel gears.

7. The robot arm assembly of claim 6, wherein the pair of bevel gears comprises a first bevel gear and a second bevel gear meshing with the first bevel gear, the first bevel gear is non-rotatably on the fifth shaft, and the second bevel gear is non-rotatably on an end of the sixth shaft adjacent to the fifth shaft.

8. The robot arm assembly of claim 1, wherein the second driving member comprises a drive shaft, the second transmission mechanism comprises a second drive wheel fixed on the drive shaft, a second transmission belt, a second action wheel driven rotated by the second drive wheel via the second transmission belt, a transmission member non-rotatably connected to the second action wheel, and a reducer connecting the transmission member and the first mechanical arm.

9. The robot arm assembly of claim 8, wherein the reducer includes a flexspline and a rigid gear meshing with the flexspline, one end of the transmission member is fixed to the second action wheel, the other end of the transmission member is fixed to the flexspline, and the rigid gear is connected to and drives the first mechanical arm.

10. The robot arm assembly of claim 1, wherein the first driving member and the second driving member are both a plurality of motors.

* * * * *